May 29, 1923.

P. BERGEON

ELECTRICAL HEATING APPARATUS

Filed Oct. 6, 1921  2 Sheets—Sheet 1

1,456,755

Fig. 2
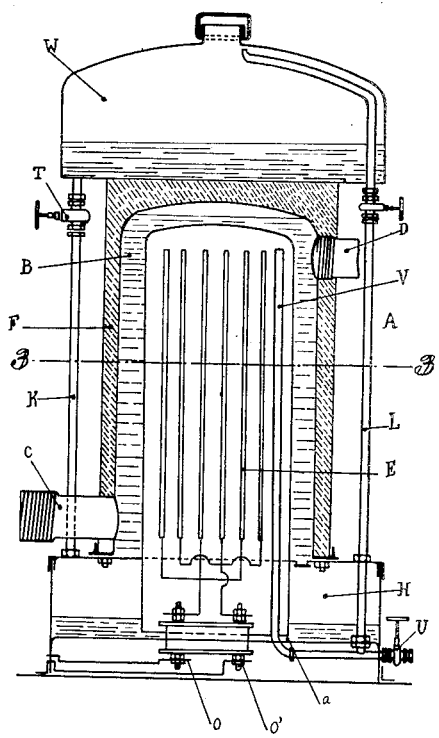
Fig. 4
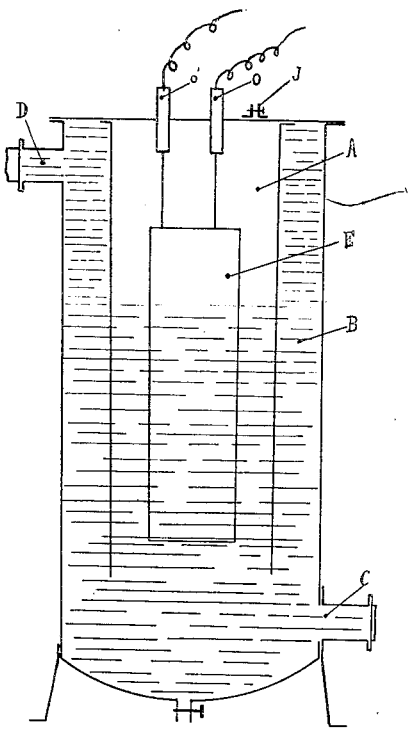
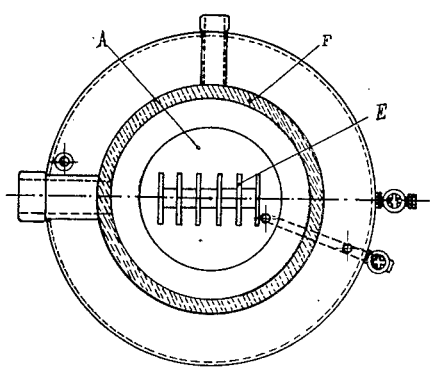
Fig. 3

Patented May 29, 1923.

1,456,755

UNITED STATES PATENT OFFICE.

PAUL BERGEON, OF GRENOBLE, FRANCE.

ELECTRICAL HEATING APPARATUS.

Application filed October 6, 1921. Serial No. 505,866.

*To all whom it may concern:*

Be it known that I, PAUL BERGEON, residing at Grenoble, France, have invented new and useful Improvements in Electrical Heating Apparatus, of which the following is a specification.

The invention relates to an apparatus for electrical heating. This apparatus can be used to heat either a liquid or a gas by means of steam produced by electrodes dipping in water.

The electrode chamber is connected with a compensating tank the purpose of which is to automatically regulate the electric power according to the amount of heat to be supplied.

In the annexed drawings, the invention is represented as applied to warm water heating for houses.

Fig. 2 is a similar view of an apparatus in which the compensating tank is located around the electrode chamber.

Fig. 3 is a horizontal section on the plane indicated by the line 3—3 of Fig. 2.

Fig. 4 is a vertical section showing a modified device in which the electrode chamber communicates with the receiver to be heated.

Figure 1:
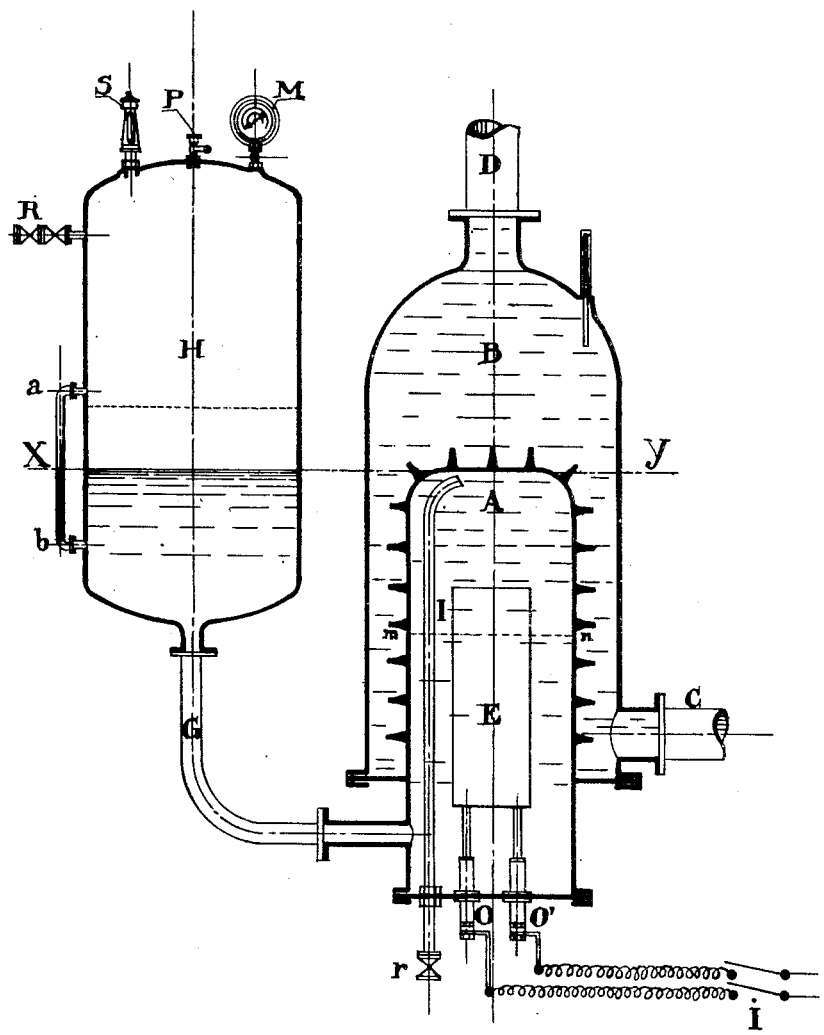
Fig. 1 is a vertical section showing an apparatus in conformity with the invention.

The apparatus shown in Fig. 1 comprises an annular shaped receiver B, where water to be heated passes through cold water entering through the pipe C and the warm water is delivered through the pipe D. Inside the heating receiver B, a chamber A contains several electrodes formed by plates E of any not oxidable metal, insulated from each other and consolidated together. These electrodes are connected through insulators O and $O^1$ with an electric alternating (single-phase or polyphase) current circuit.

The heat is transmitted from the chamber A to the receiver B through their common wall, which may be provided with ribs as shown in Fig. 1.

The electrode chamber A communicates through a pipe G with a compensating tank H provided with various accessories: a filling cock R, a blow off cock P, a level indicator $b$, a manometer M, a safety valve S. Besides, a pipe I, ended by a cock $r$, allows air to be blown from the chamber A when the apparatus is filled.

The apparatus operates as follows:

The chamber A is at first filled with water. The cock $r$ is closed and the level in H is suitably adjusted. Electrodes are then fed with current and as they are entirely immersed they take up the maximum power.

The water in A is warmed and vaporized, but the steam produced is at first condensed because the water in the receiver B being still cold cools the chamber A through the common wall.

After a while, the water in the receiver B is warm and the steam is not so quickly condensed.

The steam pressure increases and the level sinks. Consequently the immersed area of electrodes is progressively diminished and the electric power is reduced.

If the circulation of water passing through the receiver B is stopped, no condensation of steam takes place, the steam pressure tends to increase, water is forced back to the tank H and after a while cuts off the consumption of current.

It is evident that if the atmospheric pressure is maintained in the compensating tank H the temperature of steam in A and consequently the temperature of water in B never exceed the temperature of steam corresponding with the pressure due to the tank H (100° C. for a pressure of 760 millimeters of mercury).

It is evident also that the temperature of steam in A and consequently the temperature of water in B will be modified if the pressure in H is changed either owing to a partial vacuum or to compressed air. It is also possible to raise or to lower tank H or to resort to any other suitable means to obtain the desired pressure in A.

The apparatus performs by means of a constant pressure in H an automatic regulation of the consumption of electric power in the chamber A in order to obtain a predetermined temperature of water in B.

A similar apparatus may be employed to heat a gas instead of a liquid. In that case the heat transmitting surface is increased by means of ribs or tubes or any other means, and the receiver B is large enough to cause the gas to circulate slowly through the said receiver.

In the apparatus of Figs. 2 and 3, the electrode chamber A is surrounded as previously stated by the receiver B, the circulating fluid entering cool through the pipe C and going off warm through the pipe D. A jacket F filled with a heat insulating material can be provided in order to prevent any waste of heat.

The electrodes E contained in the chamber A are connected with insulators through which electric current is supplied.

The compensating tank is located at the lower part of the apparatus and around the chamber A. Both communicate through an interval $a$ between the lower edge of the chamber A and the bottom of the tank H.

Above the receiver B is a tank W, the upper part of which communicates with the upper part of the chamber A through a pipe V and a pipe L, this latter being provided with a control valve N. A valve U allows both pipes to be opened to the atmosphere.

Another pipe K, provided with a cock T, may be employed to cause a certain amount of water to flow down to the tank H, so as to produce a partial vacuum in W. The air pressure existing in the chamber A can be thus varied, so as to prevent the water from rising over the level corresponding with a determined maximum power. It is possible to open the valve U so as to cause a certain amount of air to enter the chamber A, in order to reduce the maximum power supplied.

If it is desired to supply two nets of water pipes entirely independent from each other, it is possible to locate in the annular receiver B a heating coil (non represented) and connected with a special water circuit.

Fig. 4 shows a simplified apparatus in which the electrode chamber communicates directly with the heating receiver; a compensating tank (non represented) is then connected with the pipe C or with the pipe D. A cock J opening in atmosphere allows to blow off a certain amount of air.

I claim:

1. An electric heating apparatus for gases or liquids comprising: ($a$) a heating receiver containing the fluid liquid or gas to be heated, ($b$) a chamber surrounded by the heating receiver and containing electrodes dipping in water and connected with an electric circuit, ($c$) a compensating tank communicating with the electrode chamber and containing water the surface of which is exposed either to atmospheric pressure or to any pressure the variation of water level in the electrode chamber regulating the electric power according to the temperature of the fluid to be heated.

2. An apparatus in conformity with claim 1 and in which the compensating tank is around the electrode chamber and communicates directly with the same.

3. An apparatus in conformity with claim 1, and comprising a tank located at the upper part of this apparatus, and submitted to a partial vacuum produced by causing water to flow down, so as to adjust at will the pressure in the electrode chamber.

4. A device in conformity with claim 1 and in which the electrode chamber is connected with a vacuum apparatus as a water ejector.

5. A simplified device for water heating, in which the heating receiver communicates with the electrode chamber, the compensating tank being in that case connected with the water inlet or outlet pipe.

In witness whereof I affix my signature.

P. BERGEON.

Witness:
    JULIAN KIMBLE TRUEBERY.